United States Patent [19]
Goens et al.

[11] 3,972,711
[45] Aug. 3, 1976

[54] CUPROUS CHLORIDE RECOVERY PROCESS

[75] Inventors: Duane N. Goens; Paul R. Kruesi, both of Golden, Colo.

[73] Assignee: Cyprus Metallurgical Processes Corporation, Los Angeles, Calif.

[22] Filed: Mar. 3, 1975

[21] Appl. No.: 554,685

[52] U.S. Cl. .................................. 75/117; 75/104; 75/108; 423/42; 423/46; 423/38; 423/39; 423/493; 23/296; 23/305 R
[51] Int. Cl.² .................................... C22B 15/12
[58] Field of Search .................. 423/42, 38, 46, 39, 423/493; 75/117, 108, 104; 23/296, 305

[56] References Cited
UNITED STATES PATENTS

| | | | |
|---|---|---|---|
| 3,785,944 | 1/1974 | Atwood et al. | 75/117 X |
| 3,798,026 | 3/1974 | Milner et al. | 75/117 X |

*Primary Examiner*—G. Ozaki
*Attorney, Agent, or Firm*—Sheridan, Ross & Fields

[57] ABSTRACT

A process is disclosed for separating cuprous chloride from a solution comprising cuprous chloride and at least one metal chloride compatible with the solubility of cuprous chloride, the process comprising crystallizing the cuprous chloride from the solution in the presence of cupric chloride in an amount such that the cupric chloride to compatible metal chloride mole ratio is at least about 0.1. In one embodiment, the process is employed for recovering substantially pure copper from copper sulfide concentrates, generally containing one or more metal impurities, the basic process comprising, leaching the copper sulfide concentrates with ferric chloride to produce a leach solution comprising cuprous chloride, cupric chloride, ferrous chloride and the metal impurities, crystallizing a substantial portion of the cuprous chloride from the leach solution in order to produce cuprous chloride crystals and a mother liquor, separating the crystallized cuprous chloride from the mother liquor, reducing the crystallized cuprous chloride to substantially pure elemental copper, treating a substantial portion of the mother liquor with oxygen and hydrochloric acid to produce iron oxide, cupric chloride and ferric chloride, and treating the remainder of the mother liquor in order to remove the impurities.

12 Claims, 1 Drawing Figure

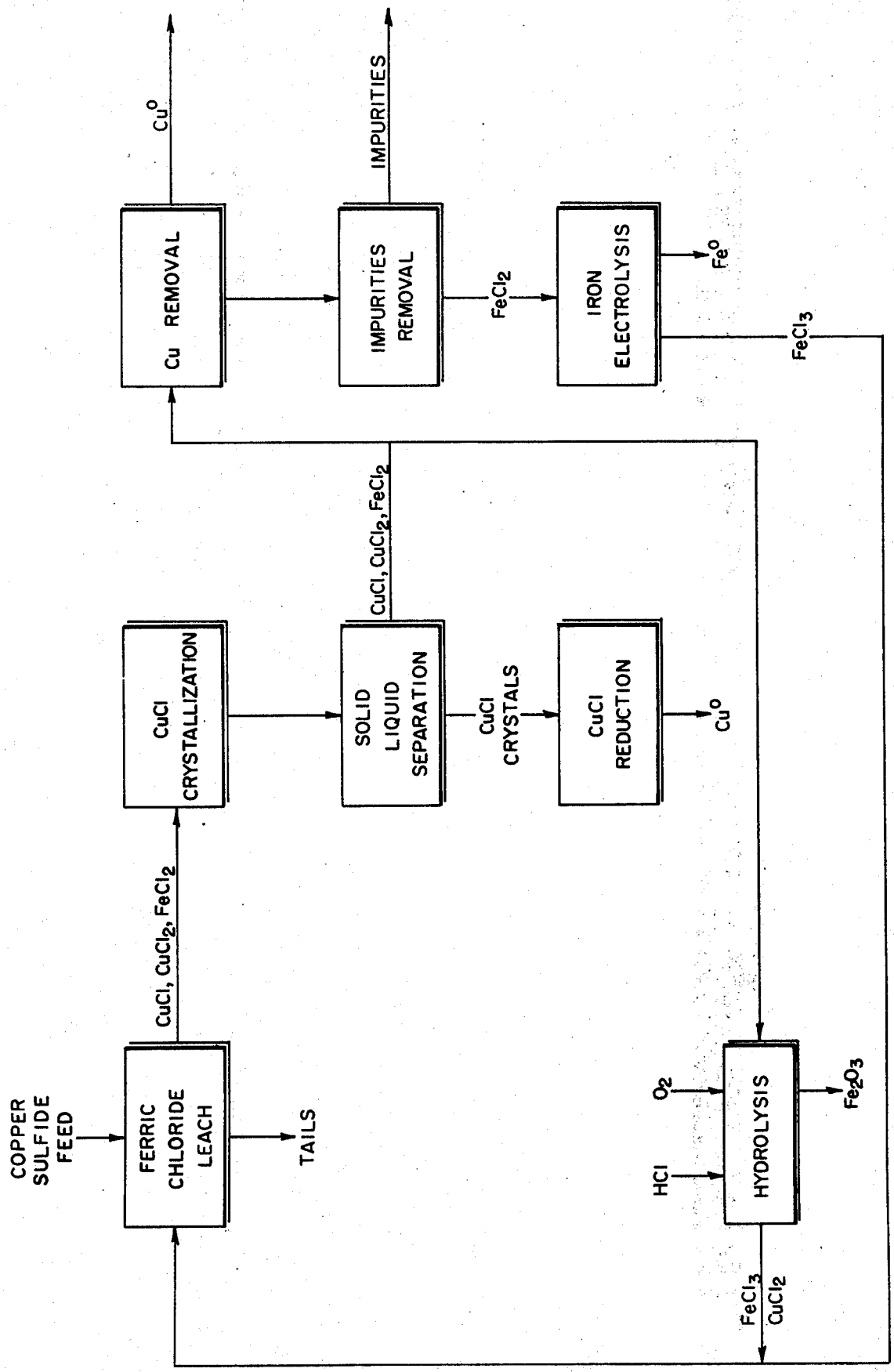

CUPROUS CHLORIDE RECOVERY PROCESS

BACKGROUND OF THE INVENTION

1. Field of the Invention

The process of this invention deals generally with selective crystallization, and more particularly with the selective crystallization of cuprous chloride from particular solutions containing particular amounts of cupric chloride.

2. Prior Art

The separation of cuprous chloride from cupric chloride solutions possessing one or more of a number of metal impurities presents a problem, particularly in the rapidly developing hydrometallurgical copper recovery processes. As is well known, the main sources of copper today are copper sulfide ores, primarily chalcopyrite. Conventional pyrometallurgical techniques for recovering copper from its sulfide ores are objectionable due to the production of sulfur dioxide, a major air pollutant. Accordingly, hydrometallurgical developments are now being considered in the copper industry to produce pollution free processes for the recovery of copper from its sulfide ores.

Many of these hydrometallurgical processes are concerned with leaching the copper sulfide ore with ferric chloride and/or cupric chloride to form elemental sulfur prior to the recovery of the copper. The sulfur dioxide pollution problem is eliminated in these processes by converting of the sulfide sulfur directly to elemental sulfur.

One of the principal difficulties in these processes is the complete conversion of the copper in the copper sulfides to cuprous chloride, the preferred intermediate for the production of elemental copper. Generally the leaching reactions produce a mixture of cuprous chloride, cupric chloride and ferrous chloride. The prior art then reduces the cupric chloride to cuprous chloride, generally by means of elemental copper, in order to produce a solution containing only cuprous chloride and ferrous chloride, which may then be conventionally treated for the production of copper. This is necessary in that cupric chloride is not easily reduced to elemental copper in the presence of the various impurities which exist in the solutions, and also due to the fact that substantially more energy is required in order to perform this reduction. U.S. Pat. No. 3,798,026 to Milner illustrates such a process. Milner leaches his copper concentrate to produce a solution containing cuprous, cupric and ferrous chlorides, reduces the cupric chloride to cuprous chloride by means of cement copper, crystallizes a portion of the cuprous chloride from the resulting leach solution and reduces this cuprous chloride by means of hydrogen reduction to elemental copper, and treats the mother liquor from the crystallization step in order to produce cement copper, regenerate the leach reagents and remove the various impurities.

Another similar process is described in U.S. Pat. No. 3,785,944 to Atwood. This process discloses the recovery of metallic copper from chalcopyrite by leaching the chalcopyrite with ferric chloride to produce cupric chloride, reducing a portion of the cupric chloride to cuprous chloride by reacting it with fresh chalcopyrite feed, reducing the remaining cupric chloride to cuprous chloride with metallic copper, reducing the cuprous chloride to metallic copper by electrolysis and conventionally regenerating the ferric chloride leach reagent and removing the impurities.

These and other similar processes represent notable advances in the art, but possess several important drawbacks. The electrolytic recovery of copper directly from the reduced leach solution, as disclosed in Atwood, produces a relatively impure grade of copper due to the amount of impurities plated with the copper during electrolysis. Also, in order to reduce the cupric chloride to cuprous chloride it is necessary to utilize elemental copper which has already been processed. This elemental copper is oxidized to cuprous chloride by the reaction with cupric chloride. Hence, this copper must remain in the process for a relatively lengthy period of time and additional energy must be consumed in order to again convert the cuprous chloride to elemental copper.

The Milner process represents an advance in the purity of the copper produced since in this process the cuprous chloride is first crystallized from the leach solution prior to its reduction to elemental copper. However, since a substantial amount of process impurities crystallize with the cupric chloride, Milner must either remove these impurities prior to crystallization or further treat the cuprous chloride crystals in order to remove the impurities. Furthermore, Milner's method of crystallization requires that all of the cupric chloride be reduced by means of elemental copper to cuprous chloride prior to the crystallization step, and as mentioned earlier this requires a substantial energy expense from the standpoint of oxidizing elemental copper which had previously been reduced and also requires a substantially prolonged residence time before all of the copper is ultimately produced.

The process of this invention overcomes these drawbacks and presents several significant advantages. A particularly important advantage which results from the application of this process is that a substantially increased amount of cuprous chloride may be maintained in and therefore crystallized from the solution. The addition of cupric chloride increases the capacity of the solution for cuprous chloride while simultaneously minimizing the amount of iron in solution. As iron in solution presents a considerable problem during the separation of the cuprous chloride crystals from solution and the subsequent washing of the crystals, minimizing the amount of iron is highly desirable.

Another advantage results when this crystallization is carried out in the presence of one or more metal impurities commonly encountered in copper bearing ores. It has been discovered that when the cuprous chloride is crystallized from a solution containing a substantial amount of cupric chloride that the amounts of certain impurities crystallized is vastly reduced. The cupric chloride apparently inhibits the inclusion of these impurities with the cuprous chloride crystals. The resulting cuprous chloride crystals are observed to be so pure in some instances that they may be directly reduced to elemental copper without the necessity of any additional purification processing. The crystallization step of this process may therefore be carried out without the necessity of first removing these impurities, as is required in the Milner process.

Furthermore, another primary advantage is recognized from the standpoint of the amount of energy required to conduct the process. As earlier mentioned when elemental copper is employed to reduce cupric chloride to cuprous chloride prior to crystallization the elemental copper is oxidized to cuprous chloride. The initial energy required to produce this elemental copper is wasted since additional energy must be consumed to again reduce the cuprous chloride to elemental copper. The process of the present invention obviates the reduction of this cuprous chloride, thereby saving the considerable additional energy.

UTILITY

In its broadest aspects the process of the present invention isolates cuprous chloride from a solution as herein described. As is well known in the chemical literature, cuprous chloride is useful in a number of applications, including serving as an intermediate in various chemical reactions. Its primary commercial value is as an intermediate for the recovery of copper from various copper bearing ores.

SUMMARY OF THE INVENTION

This invention deals with a process for crystallizing cuprous chloride from a solution comprising cuprous chloride and at least one additional metal chloride compatible with the solubility of cuprous chloride, the critical requirement being that the crystallization take place in the presence of cupric chloride in an amount such that the cupric chloride to compatible metal chloride mole ratio is at least about 0.1. The process is particularly adaptable to solutions possessing in addition to the above set forth compounds one or more metal impurities selected from the group consisting of antimony, bismuth and arsenic.

This crystallization process is of primary value in processes for recovering copper from copper bearing ores, particularly copper sulfide ores, generally comprising concentrating the copper bearing ores, leaching the concentrate with ferric chloride in order to produce a solution comprising cuprous chloride, cupric chloride, ferrous chloride and the various metal impurities existing in the concentrate; crystallizing a substantial portion of the cuprous chloride from the leach solution resulting in cuprous chloride crystals and a mother liquor, which crystallization is performed in the presence of a cupric chloride to ferrous chloride mole ratio of at least about 0.1; separating the crystallized cuprous chloride from the mother liquor; reducing the crystallized cuprous chloride to elemental copper; treating a substantial portion of the mother liquor with oxygen and hydrochloric acid in order to produce iron oxide and to regenerate cupric chloride and ferric chloride; and treating the remainder of the mother liquor in order to remove the various impurities.

BRIEF DESCRIPTION OF THE DRAWING

The FIGURE sets forth a process flow diagram incorporating the process of the invention in a particular process for recovering copper from chalcopyrite feed materials.

DESCRIPTION OF THE PREFERRED EMBODIMENTS

The invention primarily deals with an improved crystallization process for removing cuprous chloride from various solutions. Solutions suitable for the application of this process are those which comprise cuprous chloride and at least one additional metal chloride within which cuprous chloride is soluble. In other words any metal chloride which will dissolve cuprous chloride in the temperature range of approximately 40° to about 100°C is a suitable solvent. As used throughout the specification and claims the term "compatible" is used to describe metal chlorides possessing this solubility qualification. Examples of suitable metal chlorides include ferrous chloride, sodium chloride, cupric chloride, the remaining alkali metal chlorides and the alkaline earth metal chlorides. Hydrochloric acid also possesses this solubility qualification.

The solution may also possess one or more of a number of metal impurities which commonly exist with copper bearing ores. Examples of such metal impurities include antimony, lead, zinc, silver, bismuth and arsenic. Any one of these impurities may be present in the solution, as well as any combination of more than one of the impurities.

The physical separation process employed with the process of the invention is crystallization. The term crystallization as used herein is intended to mean the physical process of cooling the solution in order to decrease the solution's capacity for cuprous chloride, thereby depositing the cuprous chloride as a solid. It is observed that this is within the ordinary context of the term when the term is employed in relation to solutions.

The amount of cuprous chloride in solution is not critical to the process, but it is preferred to operate the process with a solution at or near the saturation of cuprous chloride. Similarly the upper temperature limitation of the solution is not particularly important, as long as the temperature is below the boiling point of the solution. Of course generally speaking the higher the temperature of the solution the greater capacity it will have for maintaining additional cuprous chloride in solution. The solution is therefore preferably maintained from about 80° to about 107°C.

The amount of cupric chloride required in solution to accomplish the improved cuprous chloride recovery is essential to the process. A cupric chloride to compatible metal chloride mole ratio of at least about 0.1 should be maintained. Preferably this mole ratio should be at least about 0.20 and more preferably at least about 0.25.

The solution may be cooled by most conventional means known in the art, such as heat exchange with other process streams, the use of cooling water, refrigeration, and other well known techniques.

The solution should be cooled to preferably at least about 30°C, more preferably at least about 20°C, and most preferably at least about 10°C. The yield of cuprous chloride crystals generally increases as the temperature range which the solution is cooled increases.

Cuprous chloride may be crystallized from compatible solutions in the absence of cupric chloride. However, the presence of cupric chloride in the one or more compatible metal chloride solvents increases the solution's capacity for cuprous chloride. Hence a greater amount of cuprous chloride may be carried by and therefore crystallized from the solution without increasing the concentration of the compatible metal chlorides. This is extremely advantageous in washing and purifying the cuprous chloride following the crystallization step as many of the potential compatible metal chlorides, in particular ferrous chloride and sodium chloride, present difficult wash and purification problems. By minimizing the amount of the compatible metal chlorides present, these problems are significantly facilitated.

The separation of cuprous chloride from a solution possessing one or more metal impurities selected from the group consisting of antimony, bismuth and arsenic is particularly effective. Necessarily, when cuprous chloride is crystallized from a solution in the presence of one or more of these impurities some of the impurities will be crystallized from the solution with the cuprous chloride. Further removal of these crystallized impurities is necessary if relatively pure copper is to be recovered from the crystallized cuprous chloride. This of course requires additional processing, as is disclosed in U.S. Pat. No. 3,798,026.

However, when cuprous chloride is crystallized from a compatible solution in the presence of sufficient cupric chloride the amounts of impurities concurrently crystallizing are substantially reduced. This facilitates any additional purification processing, and in many cases will actually eliminate the necessity for additional purification. Sufficient cupric chloride to accomplish this impurities reduction improvement is generally within the preferred mole ratio limits set forth above with respect to effecting improved cuprous chloride recovery.

The solution from which the cuprous chloride is crystallized may result from a number of processes. Essentially the only requirement of such a process is the production of a suitable cuprous chloride solution. Preferable processes include those which comprise leaching copper sulfide ores to produce a solution comprising cuprous chloride, cupric chloride and compatible metal chloride.

The process flow diagram of the FIGURE illustrates a relatively general process for recovering copper utilizing the particular crystallization process of this invention. The copper sulfide feed material, primarily chalcopyrite, is introduced into the leaching phase and reacted with ferric chloride and cupric chloride to dissolve the copper and iron and remove the sulfur. The remaining gangue is removed as tailings and discarded. The resulting leach solution primarily comprises cuprous chloride, cupric chloride and ferrous chloride, along with various metal impurities as set forth above. The amount of cupric chloride present is monitored to insure that the cupric chloride to ferrous chloride mole ratio is preferably at least about 0.1, more preferably at least about 0.2, and most preferably at least about 0.25. The leach reaction is generally carried on within a temperature range of about 80° to about 105°C.

This hot solution is then cooled to remove a substantial portion of the cuprous chloride in crystal form. The amount of cuprous chloride crystallized is dependent upon the various factors affecting the solubility of this compound as earlier discussed. Depending on the composition of the solution, this crystallized cuprous chloride may be relatively free of impurities, and need not undergo additional purification processing. However, if in particular cases additional processing for purification is desirable, means known in the art, as for example set forth in U.S. Pat. No. 3,798,026 may be employed. The cuprous chloride crystals may then be reduced to produce substantially pure copper. This copper may undergo melting and casting in order to form pure ingots.

The mother liquor from the crystallization stage possesses the same composition as the leach solution which was introduced into the crystallization stage, with of course the exception of a substantially reduced cuprous chloride concentration. A substantial portion of this mother liquor may be introduced into a regeneration stage in order to recover a portion of the iron as iron oxide, oxidize ferrous chloride to ferric chloride and oxidize the remaining cuprous chloride to cupric chloride. The iron oxide is removed from the process, and the ferric and cupric chlorides are recirculated to the leach stage in order to treat fresh feed material. The remainder of the mother liquor is bled to the purification stage of the process, wherein the cupric and cuprous chlorides are reduced to elemental copper and removed from the process and the remaining impurities are conventionally recovered. The resulting iron solution may be treated in the iron electrolysis stage in order to produce substantially pure iron at the cathode. The anode reaction in the iron electrolysis oxidizes ferrous chloride to ferric chloride, which may be recirculated to the leach stage in order to treat additional feed material.

The feed materials for which this process may be employed include all copper bearing compounds which are capable of being converted to cuprous chloride. Suitable ores and concentrates include, for example, chalcopyrite, bornite, chalcocite, digenite, covellite, malachite, enargite, scrap copper and others. Chalcopyrite is a particularly suitable ore for the process.

Due to the grade of ores now being mined, concentration processes are commonplace. As a result of these various concentration processes the feed material is generally sufficiently fine in order to be directly introduced into the process. However, if necessary the feed may be further subjected to grinding in order to enhance the leach reactions.

The leach stage of the process is designed to dissolve the feed material and convert the sulfide sulfur to elemental sulfur while converting the copper to cuprous and cupric chlorides. A number of such processes are known in the art and would be suitable for this process, including for example the processes disclosed in U.S. Pat. Nos. 3,785,944, 3,798,026 and the *Minerals Science Engineering* article, Vol. 6, No. 2, April 1974 by Dutrizac, et al. entitled Ferric Ion as a Leaching Medium.

A preferable leaching technique, described herein with respect to its applicability of chalcopyrite, involves a three stage countercurrent reaction utilizing ferric chloride and cupric chloride as the leaching agents. This leach process is perhaps best understood by first considering the third stage. This third stage receives heavily depleted chalcopyrite from the second stage and ferric chloride. The ferric chloride is obtained by the regeneration of ferrous chloride in a later stage of the process. The primary chemical reaction in this third stage is:

$$4FeCl_3 + CuFeS_2 \rightarrow 5FeCl_2 + CuCl_2 + 2S \qquad (1)$$

In order to insure the consummation of all of the chalcopyrite a substantial excess of ferric chloride is employed at this stage. This excess ferric chloride will react with any cuprous chloride present to produce ferrous chloride and cupric chloride as follows:

$$FeCl_3 + CuCl \rightarrow FeCl_2 + CuCl_2 \qquad (2)$$

The tails are then separated from the solution and discarded. This third stage leach solution, containing ferric chloride, ferrous chloride and cupric chloride is then introduced into the second stage.

The second stage receives partially depleted chalcopyrite from the first stage and the third stage leach solution. Additionally, regenerated ferric chloride and/or cupric chloride may be added at this stage. Again the primary reaction in this second stage is:

$$4FeCl_3 + CuFeS_2 \rightarrow 5FeCl_2 + CuCl_2 + 2S \qquad (3)$$

This reaction is preferably conducted such that essentially all of the ferric chloride is converted to ferrous chloride. The cupric chloride present in the system in turn reacts with chalcopyrite in order to produce cuprous chloride and ferrous chloride as follows:

$$3CuCl_2 + CuFeS_2 \rightarrow 4CuCl + FeCl_2 + 2S \qquad (4)$$

Any remaining chalcopyrite will be removed and sent to the third stage. The second stage leach solution therefore contains ferrous chloride, cuprous chloride and cuprous chloride. The ratio of cuprous to cupric chloride depends upon the reaction conditions employed in the second stage leach.

The second stage leach solution, after having been separated from the remaining chalcopyrite, is then recirculated to the first stage wherein it is contacted with the fresh chalcopyrite feed. If grinding is employed a portion of this solution may be mixed with the feed prior to the grinding. The leach solution containing ferrous chloride, cuprous chloride, and cupric chloride reacts with the fresh chalcopyrite feed according to the following reaction.

$$3CuCl_2 + CuFeS_2 \rightarrow 4CuCl + FeCl_2 + 2S \qquad (5)$$

All of the cupric chloride is not converted to cuprous chloride as chalcopyrite is not a sufficiently active reducing agent. Hence, the resulting leach solution from the first stage contains cuprous chloride, ferrous chloride, and cupric chloride. This solution is separated from the remaining chalcopyrite, and the chalcopyrite is sent to the second stage. The first stage leach solution is monitored to insure that cupric ion is present in a cupric chloride ratio within the limits hereinabove discussed. This solution is then sent to the crystallization stage. No reduction of cupric chloride is necessary, nor in most instances is it desirable.

Generally the process is conducted such that at least a substantial amount of cuprous chloride is crystallized from solution, and under most circumstances it is preferable to crystallize as much cuprous chloride as practical. Preferably at least about 25 percent of the cuprous chloride is removed in the crystallization step, more preferably at least about 35 percent, and most preferably at least about 50 percent is removed at this stage.

Impurities other than arsenic, antimony and bismuth may also be present in the solution from which cuprous chloride is crystallized. Many of these impurities, such as lead and zinc have essentially no tendency to separate with the cuprous chloride and therefore do not present a problem. Other impurities which may tend to partially separate with the cuprous chloride may possibly be beneficially inhibited by the process of the inventor. One impurity, silver, if initially present is preferably removed from the solution prior to the crystallization, as a substantial amount of silver crystallizes with cuprous chloride. This silver removal may be accomplished by means known in the art. If, however, some impurities are crystallized with the cuprous chloride they may be removed by additional purification techniques, such as leaching or recrystallization, prior to the production of copper.

The cuprous chloride crystals are then separated from the mother liquor. Conventional solid-liquid separation techniques may be employed, including for example centrifuging. These crystals may then be washed as necessary prior to the reduction to elemental copper. This washing is preferably conducted with dilute hydrochloric acid.

Once the crystallized cuprous chloride has been isolated from the mother liquor, a number of techniques may be employed in order to reduce the cuprous chloride to elemental copper. The cuprous chloride may be dissolved and the copper cemented from the solution. Alternatively, it may be dissolved and recovered electrolytically by means known in the art. A preferable technique to be used in conjunction with this process is to reduce the cuprous chloride by means of hydrogen reduction. The hydrogen reduction process may be carried out by various means known in the art, as for example, those set forth in U.S. Pat. Nos. 1,671,003, 3,552,498, 2,538,201, 3,321,303 and others.

Upon completion of the reduction of the cuprous chloride to elemental copper the elemental copper may be further treated by melting and casting in order to facilitate further handling. When hydrogen reduction is employed the by-product hydrogen chloride formed may be used in the regeneration stage.

The mother liquor from the crystallization stage comprises ferrous chloride, cupric chloride and some cuprous chloride, along with the various process impurities. A substantial portion of this mother liquor stream is sent to the regeneration stage. In this stage the ferrous chloride is converted to ferric chloride and iron oxide and the cuprous chloride is oxidized to cupric chloride. The applicable reactions are as follows:

$$CuCl + HCl + \tfrac{1}{4} O_2 \rightarrow CuCl_2 + \tfrac{1}{2} H_2O \qquad (6)$$

$$FeCl_2 + HCl + \tfrac{1}{4} O_2 \rightarrow FeCl_3 + \tfrac{1}{2} H_2O \qquad (7)$$

$$6FeCl_2 + 1.5 O_2 \rightarrow Fe_2O_3 + 4FeCl_3 \qquad (8)$$

The hydrogen chloride may be obtained from the hydrogen reduction stage. The regenerated ferric chloride and cupric chloride may be recirculated to the leach stage in order to treat fresh feed material.

That portion of the mother liquor which is not processed in the regeneration stage is treated in the purification stage. Preferably, from about 3 to 10 percent of the mother liquor is treated in the purification stage, and this range may vary depending upon the particular process employed and the impurity buildup in the process. This portion of the mother liquor is initially treated for the removal of copper. This copper removal may be accomplished, for example, by iron cementation or electrolysis. A preferable electrolytic process is that described by Hazen in U.S. Pat. No. 3,767,543. When electrolysis is employed a portion of the ferrous chloride from the leach stage may be circulated through the anode in order to oxidize this ferrous chloride to ferric chloride. The ferric chloride may then be reintroduced into the leach stage.

The solution from the copper removal stage is then further purified removing any last copper residue and other impurities such as zinc, lead, arsenic, antimony, bismuth, etc. The remaining ferrous chloride solution is then sent to iron electrolysis wherein iron and ferric chloride are produced. Alternatively all or a portion is sent to hydrolysis wherein ferric chloride and iron oxide are produced, as was mentioned earlier. In either case the ferric chloride produced may be utilized in the leach reaction.

EXAMPLES

The following examples demonstrate the crystallization of cuprous chloride from solutions comprising varying amounts of ferrous chloride and cupric chloride. Example numbers 1–3 presented in Table I set forth the amounts of cuprous chloride crystallized from solutions which have an initial ferrous chloride concentration of 350 grams per liter and initial cupric chloride concentration of 0, 100 and 150 grams per liter respectively. Each of the solutions were initially saturated with cuprous chloride at 80°C and then cooled to 0°C. Example numbers 4–7 presented in Table II were prepared and conducted in the same manner as those set forth in Table I, with the exception of having an initial ferrous chloride concentration of 250 grams per liter and initial cupric chloride concentrations of 0, 100, 200 and 250 grams per liter respectively. Example numbers 8–12 in Table III were similarly conducted, however the initial ferrous chloride concentration was 150 grams per liter and the initial cupric chloride concentrations were 0, 100, 200, 300 and 350 grams per liter respectively.

Example numbers 13–17 demonstrate the amount of iron which separates with cuprous chloride upon crystallization for solutions which have various different concentrations of ferrous chloride and cupric chloride. Each solution was initially saturated with cuprous chloride at 80°C and then cooled to 15°C, and the amount of iron in the crystallized cuprous chloride was then determined.

TABLE I

| Example No. | $[FeCl_2]$ (g./l.) | $[CuCl_2]$ (g./l.) | CuCl crystallized (grams per initial liter of solution) |
|---|---|---|---|
| 1 | 350 | 0 | 109 |
| 2 | 350 | 100 | 124 |
| 3 | 350 | 150 | 130 |

TABLE II

| Example No. | $[FeCl_2]$ (g./l.) | $[CuCl_2]$ (g./l.) | CuCl crystallized (grams per initial liter of solution) |
|---|---|---|---|
| 4 | 250 | 0 | 81 |
| 5 | 250 | 100 | 96 |
| 6 | 250 | 200 | 109 |
| 7 | 250 | 250 | 116 |

TABLE III

| Example No. | $[FeCl_2]$ (g./l.) | $[CuCl_2]$ (g./l.) | CuCl crystallized (grams per initial liter of solution) |
|---|---|---|---|
| 8 | 150 | 0 | 53 |
| 9 | 150 | 100 | 68 |
| 10 | 150 | 200 | 81 |
| 11 | 150 | 300 | 95 |
| 12 | 150 | 350 | 102 |

TABLE IV

| Example No. | $[FeCl_2]$ (g./l.) | $[CuCl_2]$ (g./l.) | Fe in initial solution (g./l.) | Fe in CuCl crystals (ppm) |
|---|---|---|---|---|
| 13 | 445 | 0 | 214 | 270 |
| 14 | 391 | 44 | 192 | 180 |
| 15 | 331 | 114 | 159 | 84 |
| 16 | 109 | 360 | 94 | 20 |
| 17 | 0 | 248 | <1 | <1 |

The examples in Tables I – III indicate the substantial increase in the amount of cuprous chloride crystallized from solution as the concentration of cupric chloride increases for a given amount of ferrous chloride. The examples in Table IV show the decrease in the amount of iron which separates as the mole ratio of cupric chloride increases. It is observed that the amount of iron which separates with the cuprous chloride crystals decreases at a substantially greater rate than the concentration of iron in the initial solution, due to the presence of cupric chloride.

What is claimed is:

1. In a process for separating cuprous chloride from a solution comprising cuprous chloride and at least one metal chloride compatible with the solubility of cuprous chloride selected from the group consisting of ferrous chloride, sodium chloride, cupric chloride, the remaining alkali metal chlorides and the alkaline earth metal chlorides and the non-metal chloride hydrochloric acid, wherein a substantial portion of the cuprous chloride is crystallized from the solution, the improvement comprising performing the crystallization in the presence of cupric chloride in an amount such that the cupric chloride to compatible metal chloride mole ratio is at least about 0.1.

2. The process of claim 1 wherein the metal chloride compatible with the solubility of cuprous chloride is ferrous chloride.

3. The process of claim 1 wherein the metal chloride compatible with the solubility of cuprous chloride is sodium chloride.

4. The process of claim 1 wherein the cuprous chloride solution being crystallized is reduced to a temperature at least about 30°C.

5. The process of claim 1 wherein the crystallized cuprous chloride is separated from the remaining solution and reduced to elemental copper.

6. The process of claim 1 wherein the cupric chloride to compatible metal chloride mole ratio is at least about 0.2.

7. In a process for recovering copper from copper sulfides comprising leaching the copper sulfides to produce a leach solution comprising cuprous chloride, cupric chloride, ferrous chloride and the metal impurities; crystallizing a portion of the cuprous chloride from the leach solution resulting in cuprous chloride crystals and a mother liquor, separating the cuprous chloride crystals from the mother liquor; reducing the crystallized cuprous chloride to elemental copper; treating a portion of the mother liquor with oxygen in order to produce iron oxide, cupric chloride and ferric chloride; and treating the remainder of the mother liquor in order to remove the impurities; the improvement comprising performing the crystallization step in the presence of a cupric chloride to ferrous chloride mole ratio of at least about 0.1.

8. The process of claim 7 wherein the cuprous chloride solution being crystallized is reduced to a temperature at least about 30°C.

9. The process of claim 7 wherein the cupric chloride to compatible metal chloride mole ratio is at least about 0.2.

10. The process of claim 7 wherein at least about 25 percent of the cuprous chloride is crystallized from the leach solution.

11. The process of claim 7 wherein the crystallized cuprous chloride is reduced by means of hydrogen reduction.

12. The process of claim 7 wherein the regenerated cupric chloride and ferric chloride are recycled to the leach phase of the process.

* * * * *